United States Patent Office 3,472,827
Patented Oct. 14, 1969

3,472,827
METHOD FOR PURIFYING A MIXTURE OF DIMETHYLFORMAMIDE AND ACRYLONITRILE
Alberto Pasin and Girolamo Coppola, Cesano Maderno, Italy, assignors to Snia Viscosa Societa Nazionale Industria Applicazioni Viscosa S.p.A., Milan, Italy, a company of Italy
No Drawing. Filed Jan. 18, 1966, Ser. No. 521,409
Claims priority, application Italy, Jan. 23, 1965, 1,533/65
Int. Cl. C08f 1/88, 1/08, 3/76
U.S. Cl. 260—88.7                  6 Claims

ABSTRACT OF THE DISCLOSURE

A method is disclosed for purifying a mixture of dimethylformamide and acrylonitrile obtained in a dimethylformamide recovery process from a coagulation bath used when spinning acrylonitrile polymers and copolymers to produce fibers and yarns. The mixture is treated with a strongly acidic resin, consisting of a sulphonated styrene-divinylbenzene copolymer, and with a basic resin selected from the group consisting of tertiary aliphatic amines and hydrated quaternary ammonium salts.

---

This invention relates to improvements in the methods for recovering and reusing dimethylformamide as employed in the productive processes of acrylonitrile polymers and copolymers by polymerization of acrylonitrile in dimethylformamide.

More particularly, this invention relates to an improvement introduced in the purification stage for the dimethylformamide-acrylonitrile admixture as obtained by extracting dimethylformamide from the coagulation baths according to the procedure disclosed in the application Ser. No. 316,537 filed Oct. 16, 1963, now U.S. Patent No. 3,294,651, according to which the recovery of the organic solvent, more particularly dimethylformamide, from the coagulation and/or drawing baths used in wet-spinning of polyacrylonitrile is effected by employing the acrylonitrile monomer as the extractant.

Briefly recalling the above mentioned application (to which reference should be made for a more comprehensive understanding of the basic principles and the objects of the present invention), it is anticipated herein that the process of extraction of dimethylformamide from said coagulation baths by employing acrylonitrile monomer as the extractant, yet affords in itself remarkable advantages over the extraction methods of the prior art, such as for example with methylene chloride, methyl and ethyl esters of formic and acetic acids and admixtures thereof with methylene chloride.

As a matter of fact, in addition to the advantages originated by the suppression of the distillation stages which were necessary for separating the extractant from the extracted DMF (dimethylformamide), and to the attendant elimination of the drawback consisting of the loss of important amounts of dimethylformamide and extractants, the extraction procedure was anyhow such as to offer two advantageous conditions, viz.:

(1) The dimethylformamide-acrylonitrile mixture as obtained with the extraction process is, in itself, nothing but the mixture to be introduced in the polymerization reactor for producing polymers or copolymers of acrylonitrile, obviously upon addition of suitable amounts of acrylonitrile in order that the desirable ratios, consistent with the polymerization requirements, may be obtained.

(2) The acrylonitrile-dimethylformamide mixture as obtained from said extraction procedure and under the conditions disclosed in the application, can be considered as being sufficiently pure to be sent to polymerization on account of the fact that it is virtually colorless in the majority of the cases. The aforesaid application suggested, however, that possible traces of impurities could have been readily removed by causing the mixture to pass through towers filled with granulated charcoal or deionizing resins.

As a matter of fact, by using for polymerization some mixtures obtained and extracted from coagulation baths according to the aforesaid application, it is possible to prepare polymers having sufficient purity and molecular weight, and also acceptable polymerization initiation times, along with satisfactory monomer-to-polymer ratios.

It has been, however, ascertained, according to the present invention, that the impurities occurring in said acrylonitrile-dimethylformamide mixtures as obtained according to the aforesaid application, have a particular influence on the progress of polymerization, more particularly on the initiation time and, though to lesser a degree, on the actual polymerization conversion ratio, the polymerization times being equal. It has been ascertained that the impurities of a particular nature display a specific effect of their own towards the polymerization course. It has been moreover ascertained that the selective removal of impurities of several kinds is conducive to certain advantages and effects upon polymerization and also the product obtained thereby.

The improvements according to the invention, within the frame of the purification process of dimethylformamide-acrylonitrile mixtures as obtained from the recovery procedure of the aforesaid application, and which should be subsequently used for polymerizing acrylonitrile in dimethylformamide for producing acrylonitrile polymeric or copolymeric fibres especially with the wet-spinning method, consist in the identification and utilization of particular purification methods employing ion-exchange resins and particular kinds of resins which are capable, in the surroundings formed by the organic solvent under consideration, of selectively acting towards the impurities contained in said mixtures.

It has been found that said impurities consist, as a rule, of potassium formate and acetate and, in addition, of acidic and basic impurities which are presumably originated by hydrolysis of said salts and dimethylformamide.

The experimental tests for practically embodying the improvements according to the invention and whose details will be specified later, have shown that said impurities have quite particular influence on the polymerization of acrylonitrile in dimethylformamide and more particularly on the polymerization initiation times, on the monomer-to-polymer conversion ratio, on the molecular weight of the final polymer and, lastly, also on the color of the eventually obtained yarns. It has also been found that the impurities formed by potassium acetate and formate and basic impurities exhibit a particular influence upon said factors.

The subject improvements, therefore, relate to a purification method of an acrylonitrile-dimethylformamide admixture as disclosed in the aforesaid application, and are characterized in that said purification is effected by employing ion-exchange resins, in that said resins are selected from particular groups so as to afford a selective action directed to a virtually total removal of the impurities which display an adverse effect towards the subsequent polymerization of acrylonitrile in dimethylformamide and, eventually, in that said purification process is carried out by employing both strongly acidic and basic resins.

Due to self-explanatory reasons of economy, the removal of the impurities, as obtained by employing both classes of resins, is preferably caused to take place by a single-step passage over a bed comprising both said resins.

According to a prominent feature of the invention, strongly acidic resins, belonging to the class of sulphone-group-containing styrene and divinylbenzene copolymers, are used. As basic resins are employed those based on hydrated quaternary ammonium salts or aliphatic amines. Both kinds of resins are insoluble in dimethylformamide and are capable of exchanging ions in organic solvents.

The advantageous effects of the invention have been tested in the course of experimental purifications of dimethylformamide-acrylonitrile admixtures as obtained in dimethylformamide recovery processes from coagulation baths used when spinning acrylonitrile polymers and copolymers. The dimethylformamide-acrylonitrile admixture has been obtained as a result of the extraction from said coagulation baths, of dimethylformamide with acrylonitrile, according to the teachings of the above mentioned application.

Two samples of said admixture, exhibiting different degrees of impurity, have been tested. Both samples have been treated with a strongly acidic resin consisting of a sulphone-group-containing styrene and divinylbenzene copolymer and with a basic resin consisting of tertiary aliphatic amines, both resins being capable of exchanging ions in organic solvents. In order to test the efficiency of so treated mixtures in polymerization, polymerization tests have been conducted on samples treated as described above and also on other samples, consisting of an admixture of dimethylformamide and acrylonitrile as obtained in a similar way by extraction of dimethylformamide from said coagulation baths with acrylonitrile as the extractant, but which have not undergone the treatment with the above specified resins.

More particularly, a first mixture of acrylonitrile and dimethylformamide (mixture I) has been obtained by extracting with acrylonitrile monomer a coagulation bath of potassium formate composed of 51% HCOOK, 34% water and 15% DMF, in the proportions of 8.4 parts by weight of ACN (acrylonitrile) for one hundred parts of bath, by weight. Said mixture has been shaken with dry potassium formate according to known methods so as to reduce the water percentages contained therein within a range of from 6 to 2.8%.

Upon completion of this treatment, the mixture had the following composition:

H$_2$O percent _____by weight__  2.81
ACN _____do____ 46.10
DMF _____do____ 50.94
Residual impurities after treating the mixture in oven at 105° C. _____percent__  0.143
Specific gravity at 20° C. _____ 0.8870

Fifty (50) mls. of this mixture has been put aside for a polymerization test and they are the sample which has not been treated with the resins, whereas 100 additional mls. have been passed over a mixed bed of a strongly acidic resin consisting of a sulphonated copolymer of styrene and divinylbenzene and a basic resin based on tertiary aliphatic amines.

At this stage, to 50 mls. of untreated mixture and to 50 mls. of mixture treated with the above mentioned resins (sample A), 0.15 gr. each of laurylperoxide have been added. Upon dissolution of the catalyst, the two mixtures have been introduced into two deep watch glasses and then in a thermostat set to 58° C. for carrying out the polymerization. Three hours after the initiation of polymerization, the two mixtures have been transferred into methanol containing beakers to discontinue polymerization and to recover, upon washing and drying, the produced polymers.

The latter have been weighed and the molecular weight and the degree of yellowness thereof have been determined.

In order to establish a comparison, the initiation times, the percentage of converted monomer, the molecular weight and the whiteness rating have been calculated.

The polymer yields have been calculated bearing in mind that 50 mls. of mixture contain 20.4 grs. of ACN monomer. A second ACN/DMF mixture (mixture II) has been obtained by extraction with monomeric acrylonitrile of a potassium acetate based coagulation bath containing 48% of CH$_3$COOK, 12% of DMF and 40% water, the weight proportion being of one part by wt. ACN for seven parts by wt. of bath. The mixture thus obtained contains about 65% of ACN and has been diluted with DMF so as to adjust the ACN concentration to 45% approx. so as to control polymerization while impeding too energetic a reaction.

Upon dilution, the mixture is thus composed as follows:

H$_2$O percent _____by weight__  2.2
ACN _____do____ 45.10
DMF _____do____ 52.59
Residual impurities after treating the mixture in oven at 105° C. _____percent__  0.11

Seventy (70) mls. of said mixture have been stored for the polymerization test on a sample which had not been treated with resins (sample B'). One hundred (100) additional mls. have been passed over a mixed bed of the same acidic and basic resins as used for the first mixture (mixture I). At this stage, 0.2 gr. laurylperoxide each has been added to the 70 mls. of sample B' and to the 70 mls. of the resin-treated mixture (sample B), both samples being thereafter introduced into a thermostat at 60° C. for polymerization. After 3 hrs., polymerization has been discontinued and polymers such as described above have been obtained.

The yields have been calculated recalling that 70 mls. of the mixture contain 28 grs. acrylonitrile.

The following is a tabulation of the data relative to the polymerizations of the four samples A, A', B, B'.

TABLE I

|  | Sample | | | |
| --- | --- | --- | --- | --- |
|  | A' | A | B' | B |
| Percent of impurities as a residue of the mixture after treating same in oven at 105° C. | 0.143 | 0.02 | 0.11 | 0.01 |
| Initiation time | 7 min. 15 sec. | 3 min. 30 sec. | 13 min. 3 sec. | 5 min. |
| Amount of polymer obtained, in grams | 3.2 | 9.7 | 13.6 | 15.9 |
| Percent of monomer converted into polymer | 15.9 | 47.5 | 48.6 | 56.7 |
| Mol. wt. of polymer | 9,893 | 64,307 | 58,370 | 62,470 |
| Color of polymer | Dark yellow | White | Deep yellow | White |

Preferably the said treatment with resins is effected with a rate of flow of 5 to 10 liters per hour of dimethylformamide/acrylonitrile mixture per liter of resin.

The height of the resin bed is preferably between 60 and 100 cms.

A scrutiny of the data obtained in the polymerization tests clearly shows the advantages which can be achieved by adopting the resin treatment according to the invention. As a matter of fact, the initiation time of polymerization, the amounts of polymers obtained and thus the conversion ratio of the monomer, and the color are definitely better in the treated samples.

The influence of the resin-treatment on the mixture sample obtained from potassium formate based coagulation baths (sample A) is also conspicuous. It has thus been possible to establish the paramount importance of the removal of impurities coming from said bath, as well as the surprisingly high efficiency of the improved inventive method for doing away with said impurities.

Whenever the resin treatment is applied to mixture samples drawn from potassium acetate based baths, the influence of said treatment is also highly valuable and is manifested by the definite improvement in the initiation time and the color of the polymer.

Other polymerization parameters are also improved, though to a lesser degree. This fact may suggest that the presence of potassium acetate and of the impurities deriving therefrom has a less significant influence on the latter characteristic parameters.

In summation, the inventive treatment as applied to admixtures of dimethylformamide and acrylonitrile obtained by recovering dimethylformamide from potassium formate or acetate containing coagulation baths has proved to be surprisingly efficient.

Inasmuch as a complete analysis of all the impurities occurring in said mixtures has not been made, the applicants believe that very presumably compounds, other than those identified and described, are present even in very small amounts and that these might have an undesirable polymerization-checking action.

Therefore, it is desired herein to be limited to an identification and description of the improvement, the subject of the present invention, and to an indication of the surprisingly advantageous effects obtained by putting it into practice in the purification of said dimethylformamide-acrylonitrile mixtures.

What is claimed is:

1. The process of purifying a substantially anhydrous mixture of dimethylformamide and acrylonitrile obtained in the extraction of dimethylformamide, with acrylonitrile monomer, from a coagulation and/or stretching bath used in wet-spinning acrylonitrile polymers and copolymers where the mixture contains also at least one of the group consisting of potassium acetate, potassium formate, formic acid, acetic acid, dimethylamine, dimethylamine formate, and dimethylamine acetate, which comprises treating said substantially anhydrous mixture with two different ion-exchange resins, both of which are insoluble in dimethylformamide, one of which is a strongly acidic resin selected from the group consisting of sulphonated styrene-divinylbenzene copolymers, and the other of which is a basic resin selected from the group consisting of resins having quaternary ammonium groups in hydroxide form and of resins having tertiary aliphatic amine groups.

2. The process according to claim 1, wherein the purification is carried out by passing the dimethylformamide-acrylonitrile mixture over a single bed comprising both the strongly acidic resin and the basic resin.

3. The process according to claim 1, wherein the treatment of the impure dimethylformamide-acrylonitrile mixture with the resins takes place at room temperature.

4. The method according to claim 1, wherein the treatment of the impure dimethylformamide-acrylonitrile mixture is effected at atmospheric pressure.

5. The process according to claim 1, wherein the treatment is effected with a flow of 5 to 10 liters per hour of dimethylformamide-acrylonitrile mixture per liter of resins.

6. The process according to claim 2, wherein the height of the resin bed is between 60 and 100 cms.

References Cited
UNITED STATES PATENTS

| | | | |
|---|---|---|---|
| 3,294,651 | 12/1966 | Pasin | 203—39 |
| 3,051,741 | 8/1962 | Marzolph et al. | 260—465.4 |

ALEX MAZEL, Primary Examiner

J. A. NARCAVAGE, Assistant Examiner

U.S. Cl. X.R.

252—182; 260—465, 561; 264—37